Aug. 8, 1961  C. C. BURLEY ET AL  2,995,166
METHOD FOR REMOVAL OF SKINS OF EDIBLE NUTS
Filed Aug. 12, 1957  3 Sheets-Sheet 1
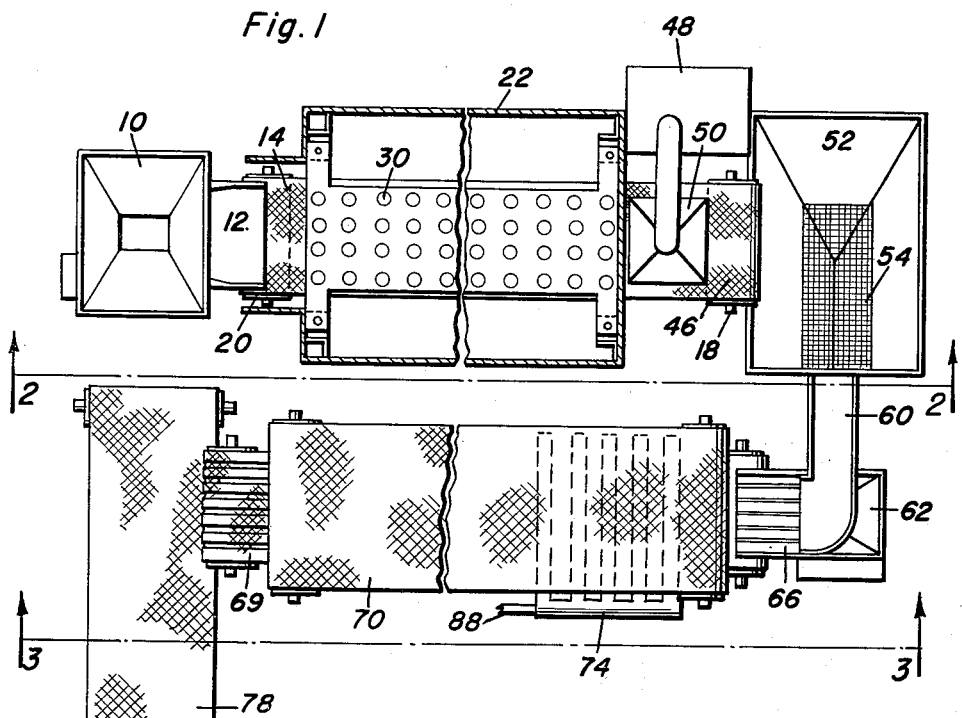
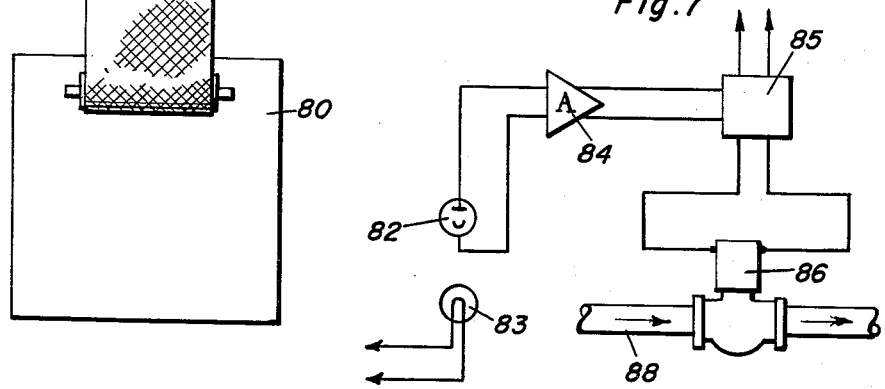
Charles C. Burley
John Moffet
INVENTORS
BY *Clarence A. O'Brien*
*and Harvey B. Jacobson*
Attorneys Aug. 8, 1961  C. C. BURLEY ET AL  2,995,166
METHOD FOR REMOVAL OF SKINS OF EDIBLE NUTS
Filed Aug. 12, 1957  3 Sheets-Sheet 2
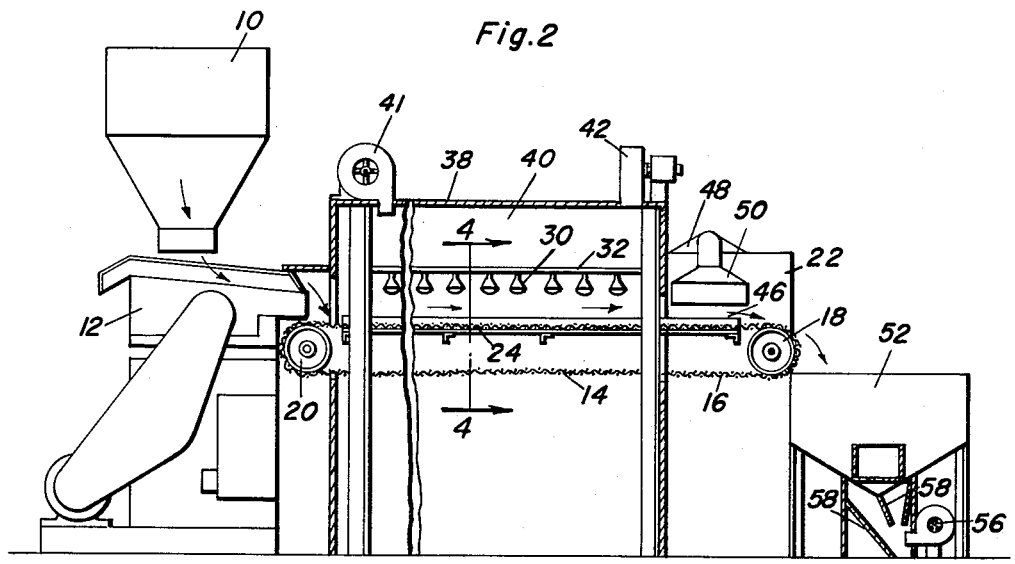
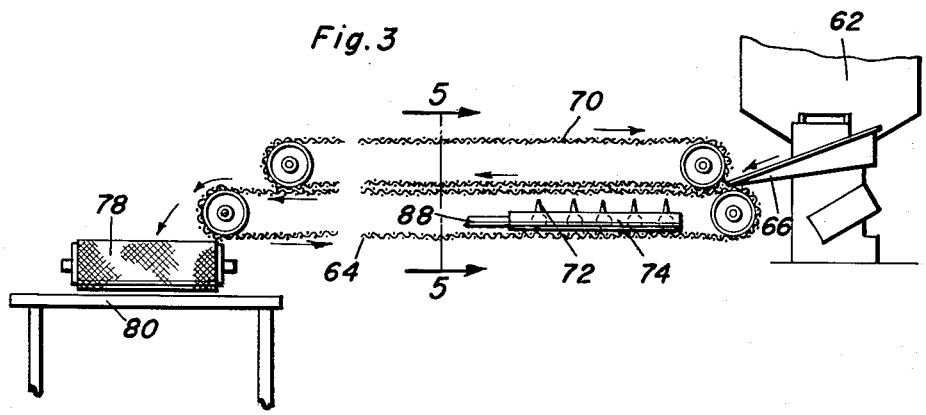
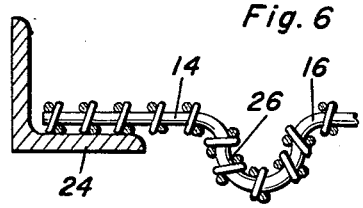
Charles C. Burley
John Moffet
INVENTORS
BY *Clarence A. O'Brien*
*and Harvey B. Jacobson*
Attorneys Aug. 8, 1961 C. C. BURLEY ET AL 2,995,166
METHOD FOR REMOVAL OF SKINS OF EDIBLE NUTS
Filed Aug. 12, 1957 3 Sheets-Sheet 3

Charles C. Burley
John Moffet
INVENTORS

United States Patent Office 2,995,166
Patented Aug. 8, 1961

2,995,166
METHOD FOR REMOVAL OF SKINS OF EDIBLE NUTS
Charles C. Burley, 708 W. 15th St., and John Moffett, 110 E. 10th St., both of Tyrone, Pa., assignors of one-third to Walter A. Criste, Cresson, Pa.
Filed Aug. 12, 1957, Ser. No. 677,459
1 Claim. (Cl. 146—227)

This invention relates to the method of removing skins from edible nuts by the application of heat and air.

An object of this invention is to provide a novel method for removing the skins of edible nuts by treating the nuts in such a manner that they are subjected to heat and air under pressure.

In our invention the nuts are first placed into a storage hopper which feeds a stoner after which the nuts are fed onto a wire woven endless belt. As the nuts are conveyed by this belt they are exposed to infra-red heat after which they are cooled and emptied into a storage bin which feeds into a vibratory feeder which feeds another belt where the nuts are trapped in grooves by an additional belt running parallel with the groove belt so as to entrap the nuts being conveyed. At this stage during the process of treating the nuts, they are exposed to air jets that are controlled electrically and/or mechanically so that the air removes the skins from the peanuts.

Then, the nuts pass from this belt after being exposed to air jets, and they are progressed to a picking table where the unblanched nuts are removed either by hand or again by electrical or mechanical stimulated means. At this time, the nuts are ready for packaging.

The above described process will accomplish what present processes fail to do. It will yield an end product that is blanched in its raw state, that is they will be the same as the red-skin peanut. The nuts retain all of their natural nutrition and natural flavor. As a result, the rancidity of the nuts is delayed indefinitely.

Our process of treating peanuts or other nuts, produces a much better product because the peanuts do not split nearly so much as peanuts which are subjected to customary abrading action for removing the skins. The yield of more expensive nuts is greater, and the nuts have a better flavor, color and texture. In the ordinary handling of nuts, the rupturing of oil cells permits oils to escape from the nuts, causing at least the surfaces of the nuts or the near surfaces to be discolored, of inferior flavor and texture, and the rupturing of these cells accelerate the rancidity of the nuts.

No process now known leaves the nut as close to the raw state after removal of the skin as does our process: The texture, color, taste, oil cells intact and far less splits than any known method.

Although there is, in a sense, criticality in the times, temperatures and other variables in our process, these are capable of being varied in accordance with the type of nut and the condition of the nut that is being treated. For example, industrial infra-red lamps are available in 100 watt to 500 watt sizes. Therefore, the distance between the lamps and the nuts will depend on the strength of the selected lamps and also the condition and types of nuts that are being treated. In a typical process, the lamps will be adjustable for varying the distance of the lamps from the product until the proper distance between lamps and nuts is arrived at in order to drive the moisture from the nuts. Peanuts may be blanched at 150° F. where the travel time of the conveyor on which the peanuts are located is from 4 to 8 minutes. The variation in time depends on the nut moisture content and the use of 250 watt infra-red lamps. The heat required for filberts would be approximately 106° F. for a maximum belt time of 10 minutes and again, depending on the moisture variances, the time or temperatures may have to be altered.

Assuming that lamp wattage remains constant at 250° F., the belt time, that is the time during which the nuts are conveyed in the presence of the lamp heat, would vary by virtue of the differential in moisture content of the nuts. It is emphasized that one of the principal features of the invention is the subjection of the edible nuts to a sufficient exposure of infra-red penetrating heat of sufficient intensity to drive the moisture content from the nuts, rupture the skins and blast the skins from the surfaces by air jets which enter the ruptured skins and complete the removal of them from the edible portions of the nuts.

A further important feature of this invention is the cooling process after blanching in order to allow the effect of a drying process after the nuts have been subject to the infra-red heat and the skins driven from the nuts by the air blast. The cooling air evaporates the moisture that is on the surface of the nuts so that the skin is more brittle. When the air blast hits the skin of each nut, the skin will rupture more readily and facilitate the removal of the skins from the nuts.

Further, the cooling steps in this invention may be accomplished by using many well known commercially available suction fans.

A further object of the invention is to provide an easily practiced method for removing the skins from nuts while maintaining the nuts in an excellent condition. Simple apparatus is used in the practice of the invention so that the process is achieved more cheaply than other processes.

The invention makes it possible to blanch nuts in their raw state enabling the nuts to retain all of their natural nutritional value, enables the nuts to delay rancidity for a long time and materially reduce splitting.

Other objects and features of importance will become apparent in following the description of the illustrated form of the invention.

FIGURE 1 is a largely schematic top view of an apparatus capable of practicing the invention, some parts of the apparatus being shown in section to illustrate otherwise hidden detail;

FIGURE 2 is a sectional view taken on the line 2—2 of FIGURE 1;

FIGURE 3 is a sectional view taken on the line 3—3 of FIGURE 1;

FIGURE 6 is an enlarged fragmentary sectional view showing a part of the first conveyor on which the nuts are transported beneath the bank of infra-red lamps; and FIGURE 7 is a schematic wiring diagram showing a control which is suggested for use in the apparatus of FIGURE 1.

Figure 4:
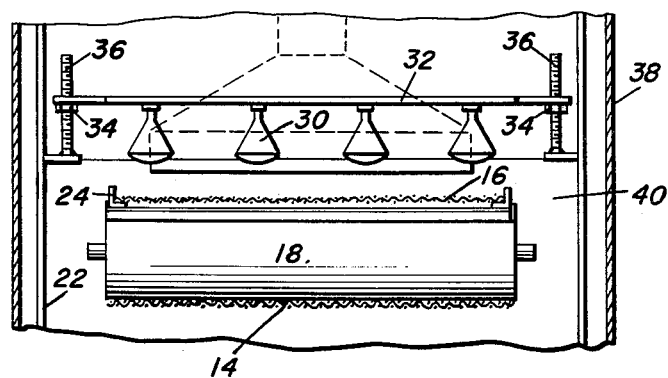
FIGURE 4 is an enlarged sectional view taken on the line 4—4 of FIGURE 2.
Figure 5:
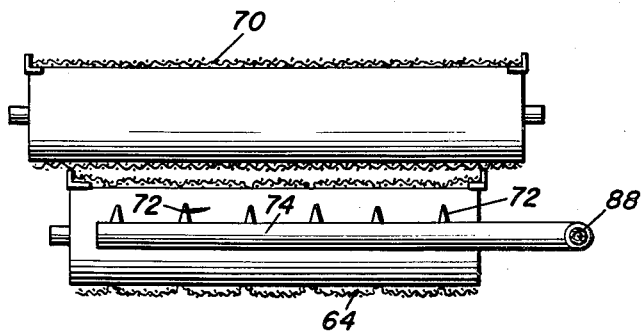
FIGURE 5 is a sectional view taken on the line 5—5 of FIGURE 3.

In the accompanying drawings there is an apparatus which is capable of practicing the process. This apparatus consists of a hopper 10 in which the product is to be initially fed. As described previously the products that are handled by the apparatus and that form the subject with which the invention deals, are nuts of various types. The storage hopper 10 feeds a stoner 12 which is of standard description. The outlet of this stoner discharges onto an end of a wire woven endless belt which constitutes conveyor 14. This conveyor has belt 16 entrained around pulleys 18 and 20 that are carried by the structure of a stand 22. A pair of side rails 24 connected with the structure 22 support the edges of the endless belt 16. As stated previously belt 16 is wire woven, but it has longitudinally upwardly opening troughs 26 formed in it (FIGURE 6) to form grooves within which to accommodate the nuts as they are undergoing their process.

A battery of infra-red lamps 30 constitutes a source of infra-red heat. These are over the upper flight of the endless conveyor and are carried by a support 32 that is adjustable vertically with respect to the upper flight of the belt 16 on which the nuts are conveyed. The adjustment may be accomplished by having support 32 provided with a plurality of nuts 34 that are adjustably disposed on vertical threaded studs 36. These studs are stationarily mounted on a part of the support 22 so that upon rotation of the nuts 34 in an opposite direction the bank of infra-red lamps 30 are adjusted with respect to the upper flight of conveyor 14. One example of the time and temperatures under which the nuts are subjected has been given. It is to be clearly understood that these temperatures will vary in accordance with the kinds of nuts that are being treated. It is not practical to enumerate the various times and temperatures that are necessary for the many types of nuts and the many conditions (moisture content) of nuts that are subjected to our process. One example given, it being understood that by increasing the temperature (using greater value bulbs) the speed of the conveyor will have to be increased, etc.

The subjection of the nuts to infra-red heat is within an enclosed zone. Housing 38 is disposed over the bank of lamps and the part of the endless conveyor beneath the lamps. The air is renewed in the zone 40 enclosed by housing 38, by blower 41 discharging in zone 40 and by suction blower 42 which draws the air from the same zone 40. The edible nuts that are subjected to the infra-red heat are maintained in the presence of the heat long enough to crack the skins of the nuts and cause an aperture to be formed in them. This aperture will be of random shape.

Thereafter the endless conveyor moves the edible nuts to a cooling station 46. The cooling is accomplished by a blower 48 which draws through a hood 50 located over the end of the endless conveyor. Thereafter the nuts are discharged into a storage bin 52 whose bottom has a screen 54 enabling blower 56 to propel air through the nuts. This air is directed by baffles 58 located between blower 56 and the nuts in the storage bin 52. This further assures that the surface moisture of the nuts is driven from them. Cooling station 46 will drive most of the moisture from the nuts, but should there be any appreciable residual moisture, it is driven from the surfaces of the nut by air from blower 56.

The cooled nuts pass through trough 60 from storage bin 52 and are fed by a vibratory feeder 62 onto an endless conveyor 64. A plurality of channels 66 are formed in the discharge end of the vibratory feeder and they direct the nuts in channels 69 that are formed in the endless conveyor 66. An endless belt 70 has its lower flight superposed over the upper flight of the endless belt 64. Conveyor 70 operates in a direction opposite to the same to assure that the nuts will be maintained in a given position on belt 64 when subjected to air blasts from the group of jets 72 of air manifold 74. The manifold is located between the upper and lower flights of endless conveyor 64 and is adapted to direct its discharge through the upper flight and through the nuts thereon. Therefore the endless conveyor 70 serves only to hold the nuts in the upper flight of conveyor 64 and provides no objectionable abrading of the nuts.

Thereafter, the nuts having been stripped by air blast of all of their skins, they are discharged onto a feed conveyor 78 which conducts them onto a picking table 80 at which they are packaged.

The control of the air jets is schematically represented in FIGURE 7. A photo sensitive cell 82 is located above the nuts and a source 83 of light is located below the nuts on the upper flight of endless conveyor 64. The adjustment of the photocell, the light and the amplifier 84 is such that the photocell detects the presence of the darker skins on the nuts. Then, when the nuts have their skins on them, the amplifier, photocell, power pack and timer 85 is energized which in turn energizes a solenoid valve 86 in air supply pipe 88. This pipe feeds the air jets manifold 74 causing a blast of air to be issued through the jets 72 for a predetermined period of time.

It is understood that various changes, alterations and modifications may be made in the invention without departing from the following claim.

What is claimed as new is as follows:

The method of treating raw peanuts from which the shells have been removed to remove the skins from the nuts without rupturing the oil cells of the nuts however retaining them in substantially the raw state comprising, applying infra-red radiation to said peanuts for a period of from 4 to 8 minutes and thus raising the temperature of the peanuts to about 150° F. to loosen and crack the skins, and subsequently blowing the skins from said peanuts.

References Cited in the file of this patent

UNITED STATES PATENTS

| | | |
|---|---|---|
| 617,266 | Watson | Jan. 3, 1899 |
| 1,664,334 | Thompson et al. | Mar. 27, 1928 |
| 2,278,941 | Musher | Apr. 7, 1942 |
| 2,557,555 | Miner | June 19, 1951 |
| 2,651,345 | Schoolcraft | Sept. 8, 1953 |
| 2,766,794 | Odale | Oct. 16, 1956 |